US007960496B2

(12) United States Patent
Choi et al.

(10) Patent No.: US 7,960,496 B2
(45) Date of Patent: Jun. 14, 2011

(54) METHOD FOR PREPARING POLYMER POLYOL STABILIZER USING MALEIC ANHYDRIDE, AND POLYMER POLYOL STABILIZER PREPARED THEREBY

(75) Inventors: Jang Hyun Choi, Daejeon (KR); Seung Moo Huh, Daejeon (KR); Jeon Koo Lee, Daejeon (KR); Jong Yeol Choi, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 239 days.

(21) Appl. No.: 12/000,621

(22) Filed: Dec. 14, 2007

(65) Prior Publication Data

US 2008/0287645 A1 Nov. 20, 2008

(30) Foreign Application Priority Data

Dec. 15, 2006 (KR) .................. 10-2006-0128371

(51) Int. Cl.
*C08G 63/58* (2006.01)
*C08G 63/42* (2006.01)
*C08G 63/676* (2006.01)
*C08G 63/78* (2006.01)

(52) U.S. Cl. ........ 528/297; 528/274; 528/300; 528/301; 528/306; 528/392; 528/393; 528/408; 528/417; 528/483; 528/490; 560/200; 560/205; 560/224; 568/857; 568/867

(58) Field of Classification Search .................. 528/483, 528/490, 274, 297, 300, 301, 306, 392, 393, 528/408, 417; 560/200, 205, 224; 568/857, 568/867

See application file for complete search history.

(56) References Cited

U.S. PATENT DOCUMENTS

| 3,673,138 | A | * | 6/1972 | Harris ............................ 528/77 |
| 4,454,255 | A | * | 6/1984 | Ramlow et al. ................ 521/137 |
| 4,458,038 | A | * | 7/1984 | Ramlow et al. ................ 521/137 |
| 4,550,194 | A | * | 10/1985 | Reichel et al. ................ 560/200 |
| 4,652,589 | A | | 3/1987 | Simroth et al. |
| 4,997,857 | A | * | 3/1991 | Timberlake et al. .......... 521/116 |
| 5,268,418 | A | | 12/1993 | Simroth |
| 2004/0266977 | A1 | * | 12/2004 | Mellado et al. ................ 528/275 |
| 2005/0085613 | A1 | | 4/2005 | Adkins et al. |

FOREIGN PATENT DOCUMENTS

JP 2005-162791 * 6/2005

* cited by examiner

*Primary Examiner* — Rabon Sergent
(74) *Attorney, Agent, or Firm* — Steptoe & Johnson LLP

(57) ABSTRACT

Disclosed herein is a novel stabilizer for preparing a polymer polyol, which is used to prepare polyurethane foam having improved physical properties. The stabilizer is prepared by allowing maleic anhydride to react with a polyether polyol, having an OH functionality of 3-8 and a molecular weight of 3,000-15,000, and then adding ethylene oxide to the reaction solution. Because the molecular weight and functionality of the stabilizer are increased through aging and dimerization, the stabilizer has a high molecular weight of 5,000-30,000, a high OH functionality of 6-10 and a viscosity of 3,000-15,000 cps/25° C. A polymer polyol derived from the stabilizer has low viscosity compared to those of prior products and contributes to the improvement in the physical properties of the resulting polyurethane foam.

4 Claims, No Drawings

METHOD FOR PREPARING POLYMER POLYOL STABILIZER USING MALEIC ANHYDRIDE, AND POLYMER POLYOL STABILIZER PREPARED THEREBY

CLAIM OF PRIORITY

This application claims priority under 35 USC 119 to Korean Patent Application No. 10-2006-0128371, filed on Dec. 15, 2006, which is incorporated by reference in its entirety.

BACKGROUND OF THE INVENTION

1. Field of the Invention

The present invention relates to a stabilizer for preparing polymer polyols, and more particularly to a stabilizer for preparing polymer polyols, which has high molecular weight and high functionality.

2. Background of the Related Art

Polymer polyol compositions, which are used in the preparation of polyurethane foams, are known materials and were first disclosed in U.S. Pat. Nos. 3,383,351 and 3,304,273. Such compositions are prepared by polymerizing one or more unsaturated monomers (styrene monomer, acrylonitrile, etc.), dissolved in polyol, in the presence of a free radical catalyst. Thus, the produced polymer particles are stably dispersed in polyol liquid, and polyurethane foams prepared from this kind of polymer polyol have high hardness and physical properties, compared to those of polyurethane foams prepared from general polyols.

Polyurethane foams prepared from polymer polyols are mainly used in the field of soft slab stock and soft molds. The soft slab stock is used in cushions, including mattresses, furniture, sofas, shoes and package buffers, and the soft mold is used in various applications, including automobile sheets, bumpers, head liners, instrument panels and sun visors.

Initially commercialized polymer polyols are prepared by polymerizing either acrylonitrile or a styrene/acrylonitrile mixture having low styrene content in polyol. They have high viscosity, yellow color, and scorch in the resulting foam products. Due to this problem, such polymer polyols could be used only in some limited applications.

In order to solve these problems, a polymer polyol prepared using a styrene/acrylonitrile mixture having high styrene content (65-75%) was developed. However, there are problems in that the increase in the styrene content leads to a great reduction in the dispersion stability of the polymer polyol, and thus the amount of solid mass produced in a filtration process is increased. Also, because the viscosity of the polymer polyol itself has a tendency to increase rapidly, it is very difficult to prepare a polymer polyol having the low viscosity and high solid content demanded in the market.

U.S. Pat. No. 4,208,314 discloses low-viscosity polymer polyols prepared using a styrene/acrylonitrile mixture. The polymer polyols of this patent are characterized by high styrene content and can provide polyurethane foams having reduced scorch. Also, U.S. Pat. No. 4,148,314 discloses a method of preparing a polymer polyol, having high dispersion stability and filterability, by adding a small amount of prepolymerized polymer polyol to a polymer polyol polymerization reaction.

In order to manufacture polyurethane having further improved physical properties, efforts to improve the properties of polymer polyols have been made. Particularly, in order to prepare a low-viscosity polymer polyol, having high polymer content together with high dispersion stability, a method of introducing a NAD (non-aqueous dispersant) stabilizer was suggested.

The NAD stabilizer serves to introduce a small amount of unsaturation into polyol and contributes to increasing the dispersion stability of solids, which are produced in the preparation of polymer polyols. U.S. Pat. Nos. 3,652,639, 3,823,201 and 3,850,861, GB Patent No. 1,126,025 and Japanese Patent Nos. 52-80919 and 48-101494 all relate to methods which use the NAD stabilizers. The concept of using the stabilizer in polymerization is well known in the prior art and is old technology as disclosed in Dispersion Polymerization in Organic Media, edited by K. E. J. Barrett, John Wiley Sons, Copyright 1975.

As relatively recent patents which employ this technology, U.S. Pat. Nos. 4,454,255 and 4,458,038 employ, as a stabilizer, a reaction product of polyol with a compound having reactive unsaturation, such as maleic anhydride or fumaric acid. Also, U.S. Pat. No. 4,460,715 discloses preparing a stabilizer using acrylate or methacrylate as reactive unsaturation.

U.S. Pat. No. 4,550,194 discloses the preparation of a stabilizer, which comprises reacting polyol (prepared from pentaerythritol having an OH functionality of 4) with maleic anhydride in the presence of calcium naphthenate and cobalt naphthenate as a catalyst, and reacting the produced carboxylic acid structure with an alkylene oxide such as ethylene oxide or propylene oxide. Similarly, in U.S. Pat. No. 4,997,857, the process of introducing unsaturation into polyol by maleic anhydride, and reacting the polyol with an alkylene oxide, is almost similar to that of U.S. Pat. No. 4,550,194, but high-molecular weight polyol having an OH functionality greater than 4, for example, sorbitol having an OH functionality of 6, is used as the polyol of a stabilizer.

The above-described stabilizers have advantages in that polymer polyols prepared using these stabilizers have low viscosity, and the resulting polyurethane has good physical properties. Despite these advantages, these stabilizers have a disadvantage in that they require a process of increasing the viscosity and molecular weight thereof either by heating for a long time or by adding diisocyanate coupling agents, such as toluene diisocyanate or methylene diisocyanate, after the stabilizers are prepared by allowing polyol to react with maleic anhydride and alkylene oxide.

Thus, there has been a continued demand for a method, which can prepare a high-viscosity, high-molecular-weight stabilizer without adding coupling agents or using a lengthy heating process.

SUMMARY OF THE INVENTION

It is an object of the present invention to provide a method which can reduce the preparation time of a polymer polyol stabilizer.

Another object of the present invention is to provide a polymer polyol stabilizer which is prepared in a short time.

Still another object of the present invention is to provide a polymer polyol, having low viscosity, high polymer content and stability, using the polymer polyol stabilizer.

Yet another object of the present invention is to provide polyurethane having improved foam hardness and physical properties, which is prepared using the polymer polyol of the present invention.

To achieve the above objects, the present invention provides a polymer polyol stabilizer, which is prepared by allowing a polyether polyol, having an OH functionality of 3-8 and a molecular weight of 3,000-15,000, to react with maleic anhydride and alkylene oxide, at an oxygen concentration of 30-80 ppm.

DETAILED DESCRIPTION OF THE PREFERRED EMBODIMENT

In the present invention, the polyether polyol is prepared by allowing a polyhydric alcohol, such as pentaerythritol, sorbitol, diether of sorbitol, mannitol, diether of mannitol, arabitol, diether of arabitol, sucrose, or oligomer of polyvinyl alcohol or glycol, to react with a suitable amount of 1,2-alkylene oxide, under conditions sufficient to convert the hydroxyl group of the alcohol to an hydroxyalkyl group. The 1,2-alkylene oxide is preferably a lower 1,2-alkylene oxide, such as ethylene oxide, 1,2-propylene oxide or 1,2-butylene oxide, and is used in the reaction in an amount sufficient to make the final molecular weight of an alkoxylated polyol adduct for the preparation of the stabilizer.

In the present invention, the polyether polyol preferably has an OH functionality of 3-8 and a molecular weight of 3,000-15,000. If the OH functionality of the polyether polyol is less than 3, side reactions will tend to occur during the preparation process, and if it is more than 8, the polyol will be present mainly in a solid form, thus making it difficult to prepare the polyether polyol. Also, if the molecular weight of the polyether polyol is less than 3,000, the effect thereof as the stabilizer will be reduced, and if it is more than 15,000, the preparation of the polyether polyol will be difficult.

In the present invention, the polymer polyol is preferably prepared by reacting polyether polyol with maleic anhydride, and then with alkylene oxide, such that the unsaturation of maleic anhydride can be protected.

In the practice of the present invention, the maleic anhydride is commercially available and is not specifically limited.

In the present invention, after the reaction of the polyether polyol with the maleic anhydride, alkylene oxide, preferably, ethylene oxide or propylene oxide, may be added to a reactor continuously or simultaneously with other reactants, in order to reduce acid value.

The acid value of the alkoxylated polyol adduct is preferably less than about 3.0, and more preferably less than about 1.0, but it should not be low such that it causes an increase in viscosity, which leads to the great loss of unsaturated bonds. Then, the product is cooled, and an excess of alkylene oxide can be removed.

In the present invention, the reaction of polyether polyol with maleic anhydride and alkylene oxide is preferably carried out using a strong base as a catalyst. Suitable bases include inorganic bases, such as alkali and alkaline earth metal hydroxides, weak acid salts of alkaline earth metal, and organic bases, such as quaternary ammonium hydroxide, 4-dimethylaminopyridine, 4-pyrrolidinopyridine and imidazole. Among them, potassium hydroxide is useful. The catalyst is used in a very small amount, and when potassium hydroxide is used as the catalyst, it is used in a small amount of less than about 200 ppm.

In the present invention, the reaction temperature suitable for the preparation of the stabilizer may be in the range of about 100-125° C., or about 180° C. or above. The reaction should be carried out in a reactor, which can perform stirring and subsequent pressurization.

In the present invention, the reaction and heating are preferably carried out at an oxygen concentration of 30-80 ppm. If the oxygen concentration is low, the time during which the viscosity and molecular weight of the stabilizer increase will become longer, and if the oxygen concentration is high, discoloration together with a rapid increase in viscosity will occur. The oxygen concentration can be controlled by controlling the concentration of oxygen in the reactor, and is preferably 50-60 ppm.

In the present invention, although the viscosity of the stabilizer may reach 30,000 cps/25° C., it is preferably in the range of about 3,000-15,000 cps, such that the stabilizer can be used in the polymer polyol preparation process.

In one aspect, the present invention provides a polymer polyol, which is prepared by allowing a polyether polyol, having an OH functionality of 3-8 and a molecular weight of 3,000-15,000, to react with maleic anhydride and alkylene oxide, at an oxygen concentration of 30-80 ppm.

In the present invention, the preparation of polymer polyol is carried out using a process in which unsaturated monomers in polyol are radical-polymerized. Unsaturated monomers that can be used include styrene, methyl styrene, ethyl styrene, acrylonitrile, methacrylonitrile, methyl methacrylate, and acylate. A combination of styrene and acrylonitrile is preferred. The monomers are added in an amount of about 20-60 wt % based on the weight of the polymer polyol product, and when styrene and acrylonitrile are used, they are used at a weight ratio of 0:100-80:20.

Examples of an initiator of the radical polymerization, which can be used in the practice of the present invention, include organic peroxide initiators, such as t-butylperoxy-2-ethylhexanoate, t-butylperpivalate, t-amylperoctoate, 2,5-dimethyl-hexane-2,5-di-per-ethylhexoate, t-butylperneodecanoate and t-butylperbenzoate, and azo initiators, such as azobis isobutyronitrile (AIBN) and azobis methylbutyronitrile (AMBN). The initiator is added in an amount of 0.1-2 wt % based on the weight of the product. Preferably, it is added in an amount of about 0.2-0.8 wt % in view of economic efficiency, even though an increase in the amount of addition thereof shows increases in polymerization rate and dispersion stability.

In the present invention, examples of the polyol, which is used in the preparation of the polymer polyol, include polyol compounds, which are prepared by the addition polymerization of alkylene oxide (e.g., ethylene oxide, propylene oxide or butylene oxide) with polyhydric alcohol (e.g., ethylene glycol, glycerin, trimethylol propane, pentaerythritol, sorbitol or sugar) or amine (e.g., triethanolamine, ethylene diamine or toluene diamine) and used in the preparation of polyurethanes.

In the practice of the present invention, a molecular weight-adjusting agent may be used in the preparation of the polymer polyol, and examples thereof include alcohols, such as methanol, ethanol, isopropanol or butanol, mercaptanes, such as ethanethiol, heptanethiol or dodecanethiol, toluene, ethylbenzene and xylene, with isopropanol, xylene, ethylbenzene and dodacanethiol being preferred.

The inventive process for preparing the polymer polyol can be carried out according to either a continuous process in which all the raw materials are quantitatively mixed with each other and continuously fed into a reactor, in which the mixture resides for a given time at a given temperature, and then is transferred to a degassing process, or a batch process in which some of the raw materials is charged into a reactor, into which a mixture of the monomers, the initiator and the raw materials is then fed at a given temperature. The polymerization temperature of the monomers may be in the range of 80-140° C., and preferably 100-130° C. After completion of the polymerization, a degassing process is carried out to remove unreacted monomers and other additives.

The polymer polyol according to the present invention is very suitable for the preparation of polyurethane foams, which are prepared by allowing polyols to react with isocyanates in the presence of a polyurethane catalyst, a foaming agent and a crosslinking agent. Thus, the present invention relates to polyurethane foams, which can be prepared by allowing the polymer polyol to react with isocyanates as described above.

Examples of isocyanates, which can be used in the present invention, 2,4-toluene diisocyanate, 2,6-toluene diisocyanate, mixtures of these diisocyanates at weight ratios of 80/20 (80/20-TDI) and of 65/35 (65/35-TDI), 4,4'-MDI (4,4'-diphenylmethane diisocyanate), 2,4'-MDI (2,4'-diphenylmethane diisocyanate), 2,2'-MDI (2,2'-diphenylmethane diisocyanate), mixtures of diphenylmethanediisocyanate isomers, polymethylene polyphenylisocyanate (polymeric MDI), toluidine diisocyanate, xylene diisocyanate, hexamethylene diisocyanate, isophorone diisocyanate, dicyclohexylmethane diisocyanate, and carbodiimido-modified products thereof, biuret modified products, dimers, trimers or prepolymers of these diisocyanates.

The polyurethane catalysts are widely known and include many compounds. Examples of commercially available catalysts are those sold under the trade names NIAX, DABCO and TEGOAMIN, and specific examples thereof include metal catalysts, such as stannous octoate, stannous oleate, dibutyltin dilaurate, dibutyltin diacetate, dibutyltin chloride, lead naphthenate, nickel naphthenate or cobalt naphthenate, and amine catalysts, such as trimethylamine, triethylamine, tripropylamine, polyisopropanolamine, tributylamine, trioctylamine, hexamethyl dimethylamine, N-methylmorpholine, N-ethylmorpholine, N-octacecylmorpholine, monoethanolamine, diethanolamine, triethanolamine, N-methyldiethanolamine, N,N-dimethylethanolamine, triethylenediamine (TEDA), N,N,N',N'-tetramethylpropylenediamine, N,N,N',N'-tetramethylbutanediamine, N,N,N',N'-tetramethylhexamethylenediamine, bis[2-(N,N-dimethylamino)ethyl]ether, N,N-dimethylbenzylamine, N,N-dimethylcyclohexylamine, N,N,N',N'-pentamethyl diethylenetriamine, triethylenediamine, and formic acid and other acid salts of triethylenediamine. The catalysts are used alone or in a mixture of two or more thereof in an amount of about 0.01-5.0 parts by weight (pbw) based on 100 parts by weight of the polyol.

The foam stabilizer used in the present invention are well-known organosilicon surface active agents, and examples thereof include B-4900, B-4113, B-8642 and the like of Gold Schmidt Co., Ltd., SH-190, SH-194, SH-200, SPX-253, PX-274C, SF-2961, SF-2962, SPX-280A, SPX-294A and the like of Tomy Silicone Co., Ltd., and F-114, F-121, F-122, F-220, F-230, F-256, F-260B, F-317, X-20-200, X-20-201 and the like of Shin-Etsu Silicone Co., Ltd. The foam stabilizer is used in an amount of 0.01-5.0 parts by weight (pbw) based on 100 parts by weight of the polyol.

The use of a crosslinking agent in the preparation of polyurethane foams is also important. The most frequent examples of the crosslinking agent include polyhydric alcohols, such as ethylene glycol, propylene glycol, diethylene glycol, triethylene glycol, 1,3-butanediol or glycerin, alkanolamines, such as triethanolamine or diethanolamine, aliphatic polyamines, such as ethylene diamine, diethylene triamine or triethylene tetramine, and aromatic polyamines, such as methylene-bis-ortho-chloroaniline, 4,4'-diphenylmethanediamine, aniline, 2,4-toluenediamine or 2,6-toluenediamine. If the crosslinking agent is used, it is used in an amount of less than 5 pbw or about 0.2-1.5 pbw, based on 100 pars by weight of the polyol.

Suitable foaming agents include water, acetone, carbon dioxide, halogenated hydrocarbon, aliphatic alkane and cycloalkane. As well-known, when water is used as a foaming agent, it reacts with isocyanate to produce carbon dioxide, which acts as a foaming agent. Aliphatic alkane and cycloalkane were developed as foaming agents substituting for CFC compounds. Examples of such alkanes include pentane, hexane, cyclopentane and cyclohexane. The foaming agents are used alone or a mixture of two or more thereof. The foaming agents are used in amounts of about 1-5 parts by weight for water and about 1-20 parts by weight for the other foaming agents. Also, as other additives, a flame retardant and a filler may be used in the present invention.

Hereinafter, the present invention will be described in further detail with reference to the following examples. It is understood, however, that these examples are illustrative only, and the scope of the present invention is not limited thereto.

EXAMPLES

Compounds used in stabilizer synthesis in the present invention and the abbreviation and concept thereof are as follows.

Polyol A: polyol prepared by allowing a sorbitol initiator to react with propylene oxide and ethylene oxide. OH number: 29, average molecular weight: 9,100 (GPC), and viscosity: 1,500 cps/25° C.

Polyol B: polyol prepared by allowing a glycerin initiator to react with propylene oxide and ethylene oxide. OH number: 34, average molecular weight: 4,950, and viscosity: 750 cps/° C.

Polyol C: polyol prepared by allowing a glycerin initiator to react with propylene oxide alone. OH value: 56, molecular weight: 3,000, and viscosity: 450 cps/25° C.

Polyol D: polyol prepared by allowing a glycerin initiator to react with propylene oxide and ethylene oxide. OH value: 56, molecular weight: 3,000, and viscosity: 410 cps/25° C.

MAN: maleic anhydride.

T-9: stannous octoate.

T-80: mixture of 2,4-toluene diisocyanate and 2,6-toluene diisocyanate at a weight ratio of 80:20 (Dong Yang Chemical Co., Ltd., Korea).

SM: styrene monomer.

AN: acrylonitrile.

AIBN: azo bis isobutyronitrile.

EB: ethyl benzene.

n-DDM: n-dodecyl mercaptane.

KOH: potassium hydroxide.

EO: ethylene oxide.

OH number: equivalent of OH groups, expressed in mg KOH/g of polyol (phthalic anhydride remaining after esterification with an excess of phthalic anhydride/pyridine solution is titrated with KOH solution; measured according to the method of ASTM D 4274-94).

Viscosity: measured using Brookfield viscometer (Model DV-II+Viscometer); unit: cps/25° C.

GPC: Gel Permeation Chromatography (SHIMADZU (LC 20AD)).

Example 1

Stabilizer Synthesis (SB.1)

19.32 kg of polyol and 3.5 g of KOH were placed in a 50-L high-pressure reactor and heated to 110° C. with stirring in a nitrogen atmosphere. At that temperature, the contents of the reactor were dewatered (water content: less than 0.05%) at a reduced pressure of 10 Torr. Water content and KOH % were measured. The temperature was lowered to 80° C., and 210 g of MAN was introduced into the reactor. The reactor was substituted with nitrogen, and the oxygen content (ppm) in the reactor was measured. The nitrogen substitution was repeated to adjust the oxygen content to 50-60 ppm. After the temperature was elevated to 110° C., 470 g of EO was introduced into the reactor at that temperature. After completion of the introduction of EO, nitrogen was charged into the reactor to increase the reactor pressure to 4.8 KG. The acid value (A.V.) and viscosity of the reaction material were measured at varying points of time, and when an acid value of less than 0.5 and the desired viscosity were reached, the reaction was stopped, and unreacted EO was removed at a pressure of 10 Torr. The resulting products had a viscosity of 7,200 cps/25° C., an acid value of 0.03 and an average molecular weight of 16,200.

Examples 2-10 (SB. 2-10)

Stabilizers were prepared in the same manner as in Example 1, except that polyols, MAN, KOH, oxygen concentration (ppm) and aging time were changed as shown in Table 1 below.

TABLE 1

Examples 1-10 for stabilizer synthesis

| Examples | Polyol A (g) | Polyol B (g) | MAN (g) | KOH (g) | $O_2$ (ppm) | Aging time (hrs) | M·W (GPC) | Acid value | Viscosity (cps/25° C.) |
|---|---|---|---|---|---|---|---|---|---|
| SB.1 | 19,320 | | 210 | 3.5 | 58 | 8 | 16,200 | 0.03 | 7,600 |
| SB.2 | 19,320 | | 190 | 3.5 | 54 | 9 | 14,800 | 0.02 | 7,100 |
| SB.3 | 19,320 | | 210 | 3.5 | 8 | 28 | 9,800 | 0.0 | 2,100 |
| SB.4 | 19,320 | | 210 | 2.3 | 51 | 10 | 13,800 | 0.01 | 5,800 |
| SB.5 | 19,320 | | 210 | 2.3 | 9 | 28 | 9,650 | 0.0 | 2,040 |
| SB.6 | 19,320 | | 230 | 3.5 | 65 | 8 | 17,600 | 0.02 | 8,150 |
| SB.7 | 19,320 | | 230 | 2.3 | 52 | 9 | 17,150 | 0.01 | 8,000 |
| SB.8 | | 19,320 | 210 | 3.5 | 54 | 9 | 8,600 | 0.01 | 3,750 |
| SB.9 | | 19,320 | 230 | 3.5 | 51 | 9 | 8,900 | 0.01 | 4,050 |
| SB.10 | | 19,320 | 210 | 2.3 | 8 | 28 | 5,600 | 0.0 | 1,050 |

As a result, in the cases of SB.3, SB.5 and SB.10, in which a low concentration of oxygen was used, an increase in the molecular weight was not shown, and the viscosity was also not increased, even when the aging time was long. This suggests that dimerization or oligomerization did not occur. On the contrary, in the case where a sufficient concentration of oxygen was provided, increases in the viscosity and the molecular weight, caused by dimerization or oligomerization, were shown at an aging time shorter than 10 hours.

Comparative Example 1

Stabilizer Synthesis; Stabilizer E

For comparison with the present invention, a stabilizer was prepared according to the method of Example 51 of U.S. Pat. No. 4,550,194.

Pentaerythritol having an OH functionality of 4 was allowed to react with propylene oxide and ethylene oxide (15 wt %), thus preparing a polyol having an OH number of 28. The polyol was allowed to react with maleic anhydride (1 wt % based on the weight of the polyol) in the presence of 200 ppm of calcium naphthenate as a catalyst, and then allowed to react with ethylene oxide (10.9 mol based on the polyol) at 125° C. for 9 hours. The temperature was lowered to 105° C., and the reaction product was degassed in a vacuum of 10 mmHg for 1 hour to remove unreacted ethylene oxide. Viscosity: 2,400 cps/25° C.

Example 11

Preparation of Polymer Polyol (CPP.11)

In a 3-liter reactor equipped with a condenser and a stirrer, 180 g of polyol D and 180 g of EB were introduced, and then heated to 120° C. in a nitrogen atmosphere. While the contents of the reactor were maintained at a temperature of 115-125° C. with stirring, a previously prepared monomer mixture (846 g of polyol D, 360 g of SM, 360 g of AN, 10.8 g of AIBN, and 72 g of stabilizer SB.1) was continuously introduced into the reactor over 2 hours. After completion of the introduction of the monomer mixture, the reaction material was aged for 30 minutes. The temperature in the reactor was elevated to 125° C., and the reaction product was degassed in a vacuum of 5 mmHg for 3 hours to remove unreacted monomers and EB. Solid content: 40%; and viscosity: 5,900 cps/25° C.

Examples 12 to 19

Preparation of Polymer Polyols (CPP 12-23)

Polymer polyols were prepared in the same manner as in Example 11, except that the kind and addition amount of polyol (polyol B or D), the addition amount and ratio of SM and AN, and the use of EB or n-DDM, were changed as shown in Table 2 below. The amounts shown in Table 2 are expressed in PBW (parts by weight). In Example 19, no stabilizer was added, the viscosity of the reaction solution was rapidly increased during the reaction, such that it could not be stirred, and thus the reaction was stopped, before the monomer mixture was completely introduced.

Comparative Examples 2 and 3

For comparison with the present invention, polymer polyols were prepared in the same manner as Examples 11 and 19, except that stabilizer E synthesized in Comparative Example 1 was used. As shown in Table 2, the polymer polyols of Comparative Examples 2 and 3 showed high viscosities compared to those of the inventive polymer polyols.

TABLE 2

Examples 11-23 and Comparative Examples 2 and 3 for polymer polyol preparation

| | CPP. 11 | CPP. 12 | CPP. 13 | CPP. 14 | CPP. 15 | CPP. 16 | CPP. 17 | CPP. 18 | CPP. 19 | Comparative Example 2 | Comparative Example 3 |
|---|---|---|---|---|---|---|---|---|---|---|---|
| Polyol B | 57 | 57.5 | 57 | 57 | | | | | | 57 | |
| Polyol D | | | | | 53 | 53 | 53 | 53 | 57 | | 53 |
| Kind of stabilizer | SB.1 | SB.1 | SB.4 | SB.4 | SB.1 | SB.1 | SB.4 | SB.4 | | E | E |
| Amount of addition of stabilizer | 3 | 2.5 | 3 | 3 | 4 | 4 | 4 | 4 | | 3 | 4 |
| SM | 20 | 20 | 20 | 20 | 30 | 30 | 30 | 30 | 30 | 20 | 30 |
| AN | 20 | 20 | 20 | 20 | 13 | 13 | 13 | 13 | 13 | 20 | 13 |
| AIBN | 0.4 | 0.4 | 0.4 | 0.4 | 0.4 | 0.4 | 0.4 | 0.4 | 0.4 | 0.4 | 0.4 |
| DDM | | 0.4 | | 0.4 | | 0.4 | | 0.4 | | | |
| EB | 10 | | 10 | | 10 | | 10 | | 10 | 10 | 10 |
| Solid content (%) | 39.8 | 39.6 | 40.1 | 39.8 | 43.5 | 43.2 | 43.4 | 43.1 | — | 38.7 | 41.9 |
| Viscosity (cps/25° C.) | 5900 | 6200 | 5700 | 5850 | 4500 | 4700 | 4450 | 4600 | — | 18,000 | 15,000 |

Examples 20-23

Preparation of Polyurethane Foams

Polymer polyol, polyol, a silicone foam stabilizer (L-580 k), an amine catalyst (A-1) and water were stirred and mixed at the ratio shown in Table 3 below, and the temperature of the solution was adjusted to 25° C. MC (methylene chloride) and T-9 were added to the mixture solution at 25° C., and the mixture was stirred at 6,000 rpm for 10 seconds. T-80 was added thereto, and the mixture was stirred at 6,000 rpm for 6 seconds and injected into a mold having a size of 20 cm×20 cm×20 cm. After 15 minutes, the foam material was released from the mold, and after 24 hours, the mechanical properties of the foam material were measured. Each of the mechanical properties was measured in accordance with the methods of ASTM D-3574. The measurement results are shown in Table 4 below.

Comparative Example 4

The polymer polyol of Comparative Example 3 was used at the ratio shown in Table 3, thus preparing polyurethane foam. The physical properties of the polyurethane foam were measured, and the measurement results are shown in Table 4 below. As shown in Table 4, the polymer polyol of Comparative Example 3 had high viscosity and showed physical properties inferior to those of the inventive polymer polyol.

TABLE 3

| Polymer polyol | 50 |
|---|---|
| Polyol C | 50 |
| L-580k | 1.7 |
| A-1 | 0.11 |
| $H_2O$ | 5 |
| MC | 7.5 |
| T-9 | 0.36 |
| T-80 | 57.6 |

TABLE 4

| | | Test results | | | | |
|---|---|---|---|---|---|---|
| Test items | | Example 20 (CPP. 15) | Example 21 (CPP. 16) | Example 22 (CPP. 17) | Example 23 (CPP. 18) | Comparative Example 4 (Comparative Example 3) |
| Density | kg/m³ | 16.11 | 16.35 | 16.54 | 16.30 | 17.56 |
| Hardness (25% compression) | kg/314 cm² | 26.11 | 25.24 | 25.88 | 26.32 | 20.6 |
| (65% compression) | kg/314 cm² | 70.1 | 68.7 | 69.1 | 68.84 | 58.12 |
| Tear strength | kg/cm | 0.41 | 0.42 | 0.45 | 0.39 | 0.31 |
| Tensile strength | kg/cm² | 0.78 | 0.78 | 0.65 | 0.68 | 0.54 |
| Elongation | % | 66.37 | 64.20 | 64.10 | 68.4 | 51 |
| Resilience | % | 30 | 30 | 30 | 30 | 25 |
| Compression set | % | 4.8 | 3.2 | 3.6 | 4.1 | 5.11 |

Although the above examples have been described in detail with respect to the present invention, it is to be understood that these examples are illustrative only and are not to be construed to limit the scope of the present invention.

As described above, according to the present invention, a stabilizer having high molecular weight (5,000-30,000) is prepared by allowing a sorbitol initiator or a polyhydric alcohol initiator (e.g., a glycerin initiator (OH functionality of 3) or a pentaerythritol initiator (OH functionality of 4)) to react with alkylene oxide such as propylene oxide or ethylene oxide, so as to prepare a polyol, allowing the polyol to react with maleic anhydride, adding ethylene oxide to the reaction product, and then aging the reaction product for a short time. The stabilizer can be prepared in an economic manner by controlling oxygen concentration. A polymer polyol derived from the stabilizer has high dispersion stability and low viscosity and contributes to the improvement in the physical properties of the resulting polyurethane.

What is claimed is:

1. A method for preparing a polymer polyol stabilizer, characterized in that a polyether polyol, having an OH functionality of 3-8 and a molecular weight of 3,000-15,000, is reacted with maleic anhydride and alkylene oxide in the presence of a basic catalyst in a reactor, wherein an oxygen concentration in the reactor is 30-80 ppm.

2. The method of claim 1, wherein the alkylene oxide is ethylene oxide, propylene oxide, or a mixture thereof.

3. The method of claim 1, wherein the polyether polyol is prepared using sorbitol as an initiator.

4. The method of claim 1, wherein the reaction is carried out for less than 10 hours.

* * * * *